(12) United States Patent
Ryan et al.

(10) Patent No.: US 9,473,572 B2
(45) Date of Patent: Oct. 18, 2016

(54) SELECTING A TARGET SERVER FOR A WORKLOAD WITH A LOWEST ADJUSTED COST BASED ON COMPONENT VALUES

(71) Applicant: INTERNATIONAL BUSINESS MACHINES CORPORATION, Armonk, NY (US)

(72) Inventors: John F. Ryan, Amherst, NY (US); Bruce A. Foster, Dunstable, MA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 14/052,985

(22) Filed: Oct. 14, 2013

(65) Prior Publication Data

US 2015/0106522 A1    Apr. 16, 2015

(51) Int. Cl.
  *G06F 15/173* (2006.01)
  *H04L 29/08* (2006.01)

(52) U.S. Cl.
  CPC ................ *H04L 67/1023* (2013.01)

(58) Field of Classification Search
  CPC ........... H04L 67/1023; H04L 67/1004; H04L 67/1002
  USPC ........................................ 709/226, 224, 225
  See application file for complete search history.

(56) References Cited

U.S. PATENT DOCUMENTS

| | | | |
|---|---|---|---|
| 6,681,156 B1 | 1/2004 | Weiss | |
| 6,876,991 B1 | 4/2005 | Owen et al. | |
| 6,944,816 B2 | 9/2005 | Updegrove | |
| 6,978,257 B1 * | 12/2005 | Halbout | G06Q 30/0283 705/34 |
| 7,082,423 B2 | 7/2006 | Purcell | |
| 7,096,188 B1 | 8/2006 | Schlick et al. | |
| 7,133,805 B1 * | 11/2006 | Dankenbring | G06F 11/3414 702/182 |
| 7,171,287 B2 | 1/2007 | Weiss | |
| 7,401,059 B1 | 7/2008 | Owen et al. | |
| 7,478,076 B1 | 1/2009 | Owen et al. | |
| 7,499,898 B1 | 3/2009 | Owen et al. | |
| 7,593,910 B1 | 9/2009 | Owen et al. | |
| 7,596,538 B1 | 9/2009 | Owen et al. | |
| 7,617,169 B1 | 11/2009 | Owen et al. | |
| 7,970,722 B1 | 6/2011 | Owen et al. | |

(Continued)

OTHER PUBLICATIONS

Mysiak, Jaroslav, "Decision Methods", NetSyMoD, Sep. 2010.

(Continued)

*Primary Examiner* — June Sison
*Assistant Examiner* — Adam Cooney
(74) *Attorney, Agent, or Firm* — Owen J. Gamon; Grant A. Johnson (57) ABSTRACT

If a first workload is supported by candidate servers with different architectures, a determination is made that a selected workload is the first workload. If the first workload is not supported by candidate servers with the different architectures, a determination is made that the selected workload is a second workload. Components of the candidate servers are determined, and statistics are collected, and component values are determined. If the components impact performance of the selected workload, weights are set for the components to be a percentage impact of the components on the selected workload. If the components do not impact performance, weights are set to be one. Functions of the component values and the weights are calculated. The results of the functions are processed with costs of the candidate servers to yield adjusted costs. The selected workload is moved to the candidate server with a lowest adjusted cost.

16 Claims, 6 Drawing Sheets

(56) References Cited

U.S. PATENT DOCUMENTS

| | | | |
|---|---|---|---|
| 7,971,180 B2 | 6/2011 | Kreamer et al. | |
| 8,005,777 B1 | 8/2011 | Owen et al. | |
| 8,021,156 B2 | 9/2011 | Sweeney | |
| 8,065,261 B2 | 11/2011 | Kellogg et al. | |
| 8,909,782 B2 * | 12/2014 | Desai | H04L 67/1027 709/225 |
| 2001/0027455 A1 | 10/2001 | Abulleil et al. | |
| 2002/0178259 A1 * | 11/2002 | Doyle | H04L 29/06 709/225 |
| 2005/0203791 A1 | 9/2005 | Nadal | |
| 2007/0226341 A1 * | 9/2007 | Mateo | H04L 12/66 709/226 |
| 2008/0091514 A1 | 4/2008 | Fung et al. | |
| 2010/0017460 A1 * | 1/2010 | Shen | G06F 9/505 709/203 |
| 2012/0106333 A1 * | 5/2012 | Lee | H04L 67/1002 370/230 |
| 2013/0111469 A1 * | 5/2013 | B | G06F 3/1211 718/1 |
| 2013/0275382 A1 * | 10/2013 | Chi | G06F 17/303 707/654 |

OTHER PUBLICATIONS

"Quality of Life—College Rankings", http://www.ordoludus.com/9.html.
"Kepner-Tregoe Decision Making", http://www.kepner-tregoe.com/.
"BCG Matrix—Meaning and Its Limitations", http://www.managementstudyguide.com/bcg-matrix.htm.
"Customer Value Measurement/Market Value Solutions", http://www.marketvaluesolutions.com/customer-value-measurement/.

* cited by examiner

SERVER DATA (142)

| WORKLOAD (302) | SUPPORTED BY SERVER (304) | ARCH (306) | SERVER COST (308) | ADJUSTED SERVER COST (310) |
|---|---|---|---|---|
| DATABASE QUERIES | SERVER A | CPU: 2 GHZ RAM: 16GB | 4000 | 4200 |
| VIDEO STREAM | SERVER B | CPU: 3 GHZ RAM: 20GB | 4500 | 4400 |
| FINANCE | SERVER C | CPU: 3 GHZ RAM: 20GB | 4700 | 3900 |
| DATABASE QUERIES | SERVER B | CPU: 3 GHZ RAM: 20GB | 4500 | 3900 |
| IMAGE RENDER | SERVER A | CPU: 2 GHZ RAM: 16GB | 4000 | 4500 |
| IMAGE RENDER | SERVER B | CPU: 3 GHZ RAM: 20GB | 4500 | 4800 |

| | | VALUE MATRIX | | | |
|---|---|---|---|---|---|
| 402 | 404 | 406 | 408 | 410 | 412 |
| SERVER | COMPONENT ID | STATISTICS | COMPONENT VALUE | EFFECT | WEIGHT |
| SERVER A | CRYPT | 38709 OPS/SEC | | T | |
| SERVER A | AVAIL | 4 YEARS MTTF | | F | |
| SERVER A | COMPRESS | .85 GB RAM USED | -.15 | T | .3 |
| SERVER A | CPU UTIL | 60% | -.5 | T | .25 |
| SERVER A | VIRTUAL OVERHEAD | 1000 MB/SEC | .1 | T | .85 |
| SERVER B | CRYPT | 6791 OPS/SEC | 5.7 | T | .05 |
| SERVER B | AVAIL | 5 YEARS MTTF | .2 | F | 1 |
| SERVER B | COMPRESS | 1 GB RAM USED | | T | |
| SERVER B | CPU UTIL | 90% | | T | |
| SERVER B | VIRTUAL OVERHEAD | 900 MB/SEC | | T | |

FIG. 6 ized cost based on component values

FIELD

An embodiment of the invention generally relates to computer systems and more particularly to computer systems with potentially different architectures that execute similar or identical workloads.

BACKGROUND

Computer systems typically comprise a combination of hardware (such as semiconductors, transistors, chips, and circuit boards) and computer programs that the hardware stores and executes. Many different types of computer systems are available with different architectures, employing different processors, amounts of memory and secondary storage, and various other components or capabilities. These different computer systems may have different associated costs and may also be capable of executing different workloads with different performance characteristics.

SUMMARY

A method, computer-readable storage medium, and computer system are provided. In an embodiment, a request is received to move a first workload from a given server. A determination is made on whether the first workload is supported by a plurality of candidate servers with different architectures. If the first workload is supported by the plurality of candidate servers with different architectures, a determination is made that a selected workload is the first workload. If the first workload is not supported by the plurality of candidate servers with the different architectures, a determination is made that the selected workload is a second workload that is an alternative to the first workload, wherein the second workload is supported by the plurality of candidate servers with the different architectures. Components of the plurality of candidate servers are determined, and statistics are collected for the components. Component values of the components are determined based on the statistics and/or metrics available for those components. If the components impact performance of the selected workload, weights are set for the components that impact the performance to be a percentage impact of the components on the selected workload. If the components do not impact performance of the selected workload, weights are set for the components that do not impact the performance of the selected workload to be the value one. Functions of the component values and the weights are calculated to yield results. The results of the functions are added to costs of the plurality of candidate servers to yield a plurality of adjusted costs of the plurality of candidate servers. The selected workload is moved from the original server to one of the plurality of candidate servers with a lowest of the plurality of adjusted costs.

It is to be noted, however, that the appended drawings illustrate only example embodiments of the invention, and are therefore not considered a limitation of the scope of other embodiments of the invention.

DETAILED DESCRIPTION

Figure 1:
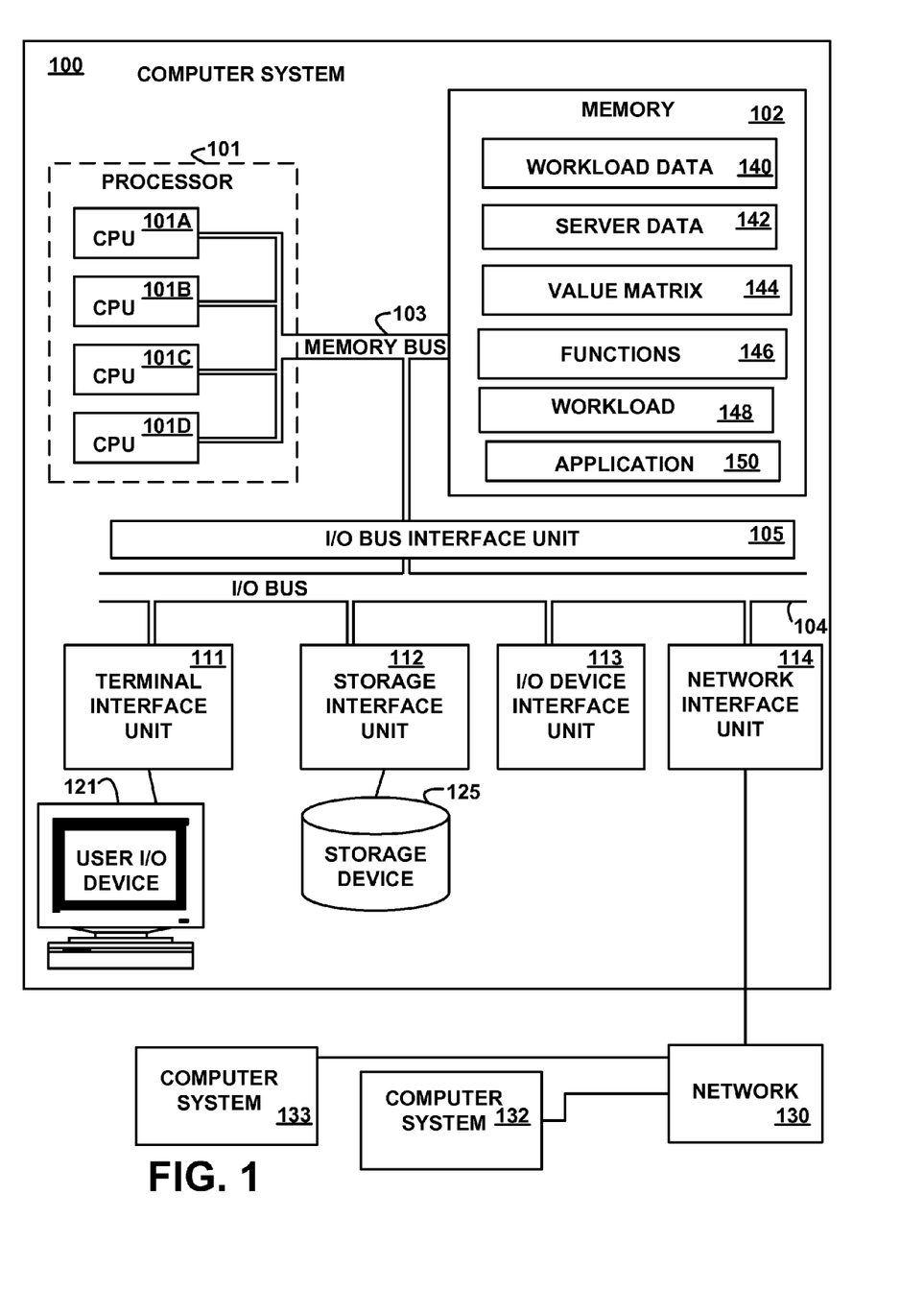
FIG. 1 depicts a high-level block diagram of an example system for implementing an embodiment of the invention.

Referring to the Drawings, wherein like numbers denote like parts throughout the several views, FIG. 1 depicts a high-level block diagram representation of one embodiment of a computer system 100 connected to computer systems 132 and 133 via a network 130, according to an embodiment of the present invention. The major components of this computer system 100 embodiment comprise one or more processors 101, memory 102, a terminal interface unit 111, a storage interface unit 112, an I/O (Input/Output) device interface unit 113, and a network interface unit 114, all of which are communicatively coupled, directly or indirectly, for inter-component communication via a memory bus 103, an I/O bus 104, and an I/O bus interface unit 105.

The computer system 100 comprises one or more general-purpose programmable central processing units (CPUs) 101A, 101B, 101C, and 101D, herein generically referred to as the processor 101. In an embodiment, the computer system 100 comprises multiple processors typical of a relatively large system; however, in another embodiment the computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access computer architectures.

The memory 102 is illustrated as comprising, storing, or encoding the workload data 140, the server data 142, the value matrix 144, the functions 146, the workload 148, and the application 150. Although the workload data 140, the server data 142, the value matrix 144, the functions 146, the workload 148, and the application 150 are illustrated as being stored within the memory 102 in the computer system 100, in other embodiments some or all of them may be on different computer systems and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the workload data 140, the server data 142, the value matrix 144, the functions 146, the workload 148, and the application 150 are illustrated as residing in the memory 102, these elements are not necessarily all completely contained in the same storage device at the same time.

In various embodiments, the workload 148 may be implemented as applications, operating systems, virtual machines, or partitions, and the amount, number, and/or type of the workload 148 may change dynamically as additional workloads 148 are added to the computer system 100, removed from the computer system 100, or moved from the computer system 100 to the computer systems 132 and/or 133. The workload 148 may comprise instructions that execute on the processor 101 or statements that are interpreted by instructions that execute on the processor 101. In other embodiments the workload 148 comprises requests or commands that are processed by programs executing on the processor 101, the number of requests or commands may vary, and the requests or commands may be sent to the computer systems 132 and/or 133 instead of the computer system 100.

In an embodiment, the functions 146 and/or the application 150 comprise instructions that execute on the processor 101 or statements that are interpreted by instructions executing on the processor 101 to perform the processing as further described below with reference to FIGS. 2, 3, 4, 5, and 6. In another embodiment, the functions 146 and/or the application 150 may be implemented in microcode or firmware. In another embodiment, the functions 146 and/or the application 150 may be implemented in hardware via logic gates, semiconductor devices, chips, circuits, circuit cards, and/or other physical hardware devices.

The memory bus 103 provides a data communication path or communications fabric for transferring data among the processor 101, the memory 102, and the I/O bus interface unit 105. The I/O bus interface unit 105 is further coupled to the I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the I/O bus 104.

The I/O interface units support communication with a variety of storage and I/O devices. For example, the terminal interface unit 111 supports the attachment of one or more user I/O devices 121, which may comprise user output devices (such as a video display device, projectors, a speaker, and/or television set) and user input devices (such as a microphone and a speech recognition device, a gesture detection device, a camera, a keyboard, a mouse, a keypad, a touchpad, a trackball, buttons, Radio Frequency Identifier Tags, a light pen, a finger, a stylus, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device. The user I/O device 121 may be of any size and may accommodate multiple users viewing and touching the display device simultaneously or collaboratively, and in an embodiment, any user may touch at any location on the display device.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface unit 113 provides an interface to any of various other input/output devices or devices of other types, such as printers or fax machines. The network interface unit 114 provides one or more communications paths from the computer system 100 to other digital devices and computer systems, e.g., the computer systems 132 and 133; such paths may comprise, e.g., one or more networks 130.

Although the memory bus 103 is shown in FIG. 1 as a relatively simple, single bus structure providing a direct communication path among the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer system 100 may, in fact, comprise multiple I/O bus interface units 105 and/or multiple I/O buses 104. While multiple I/O interface units are shown, which separate the I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable bus, network, or any multiple or combination thereof, and may support any appropriate protocol suitable for communication of data and/or code to/from the computer system 100 and the computer systems 132 and 133. In various embodiments, the network 130 may represent a storage device or a combination of storage devices, either connected directly or indirectly to the computer system 100 and the computer systems 132 and 133. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented as an intranet. In another embodiment, the network 130 is implemented as any appropriate cellular data network, cell-based radio network technology, or wireless network. In another embodiment, the network 130 is implemented as any suitable bus, network, or any multiple or combination thereof.

The computer systems 132 and 133 may comprise some or all of the hardware and program components of the computer system 100 with the same or different data. Any number of the computer systems 100, 132, and 133 may be present.

FIG. 1 is intended to depict the representative major components of the computer system 100, the network 130, and the computer systems 132 and 133. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations, and the mechanisms and apparatus of embodiments of the present invention apply equally to any such appropriate computing system. In addition, the various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in the one or more processors and/or co-processors 101, various memory 102, and storage devices 125 in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including assembly languages, object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), Cloud, or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices, such as a robot, to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s) and/or comment(s) that describes the logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, home environment, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
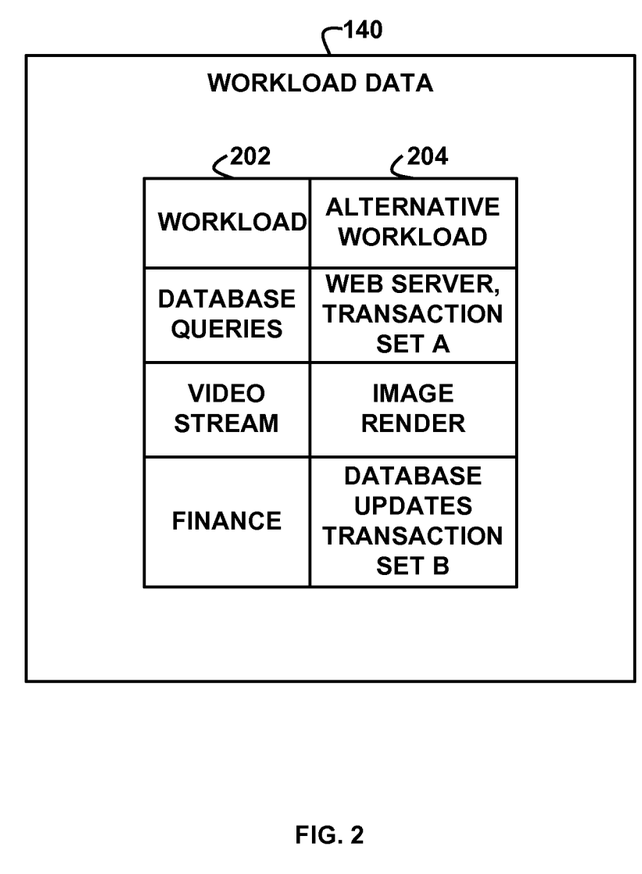
FIG. 2 depicts a block diagram of example workload data, according to an embodiment of the invention.

FIG. 2 depicts a block diagram of example workload data 140, according to an embodiment of the invention. The workload data 140 comprises any number of entries, each of which comprises a workload identifier field 202 and an alternative workload identifier field 204. The workload identifier field 202, in each entry, identifies one of the workloads 148. The alternative workload field 204, in each entry, identifies one of the workloads 148 that is an alternative to the workload 148 identified by the workload identifier field 202, in the same entry. A workload 148 identified by the alternative workload field 204 provides similar or equivalent functions or has similar performance characteristics or resource requirements as the workload 148 identified by the workload identifier field 202, in the same entry. That is, the performance characteristics or resource requirements of the workload 202 and the alternative workload 204 are within (less than) threshold values of each other. The computer system 100 may receive data from the user I/O device 121 or the computer systems 132 and/or 133 and store the data to the workload data 140.

Figure 3:
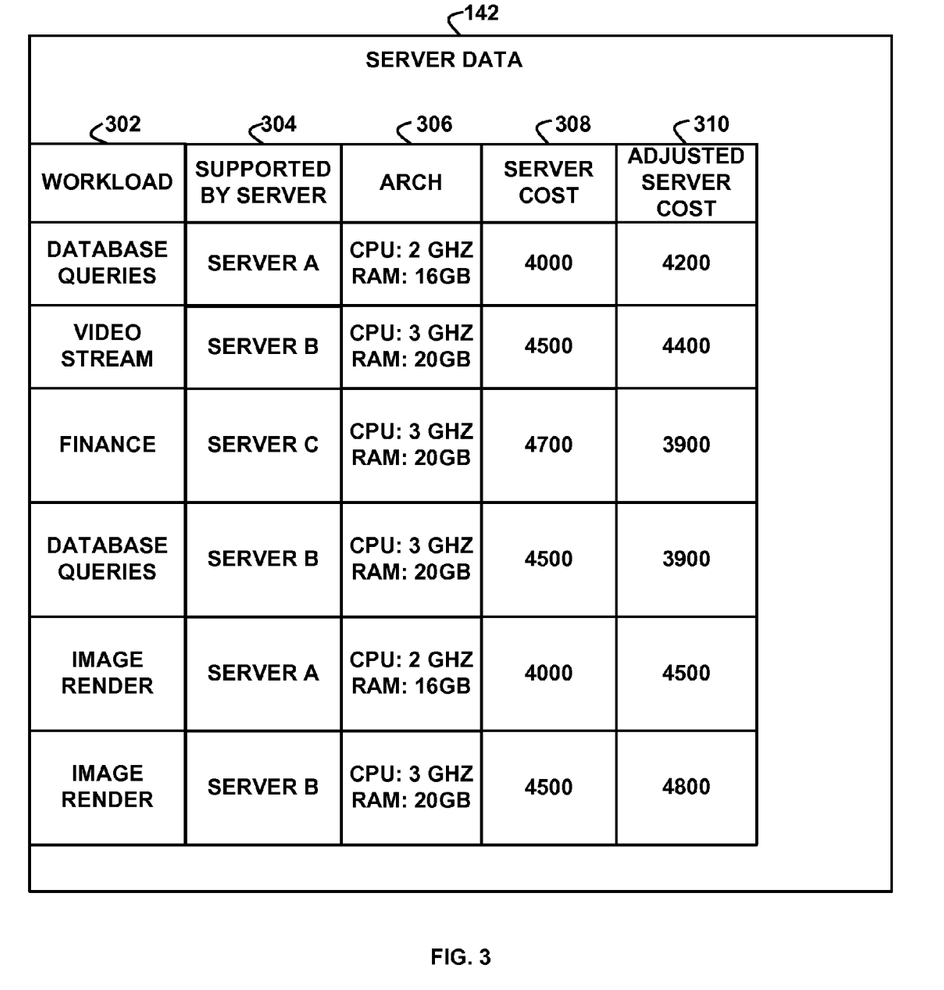
FIG. 3 depicts a block diagram of example server data, according to an embodiment of the invention.

FIG. 3 depicts a block diagram of example server data 142, according to an embodiment of the invention. The server data 142 comprises any number of entries, each of which comprises a workload identifier field 302, as supported by server field 304, an architecture (arch) field 306, a server cost field 308, and an adjusted server cost field 310. The workload identifier field 302, in each entry, identifies one of the workloads 148. The supported by server field 304, in each entry, identifies a server computer system (e.g., the computer systems 100, 132, or 133) that provides the resources (e.g., processor, memory, secondary storage, I/O devices, and network bandwidth) specified by the architecture field 306, in the same entry, that are sufficient to execute the workload 148 identified by the workload identifier field 302, in the same entry. The server cost field 308, in each entry, specified the cost, price, or amount of money necessary to purchase, rent, or license the server identified by the supported by server field 304, in the same entry, and to purchase, rent, or license use of the resources identified by the architecture field 306, in the same entry. The adjusted server cost 310, in each entry, specifies the value of the server, identified by the supported by server field 304, in the same entry, relative to other servers represented by other entries in the server data 142, as adjusted by the application 150 and/or the functions 146, based on the value matrix 144, as further described below.

Figure 4:
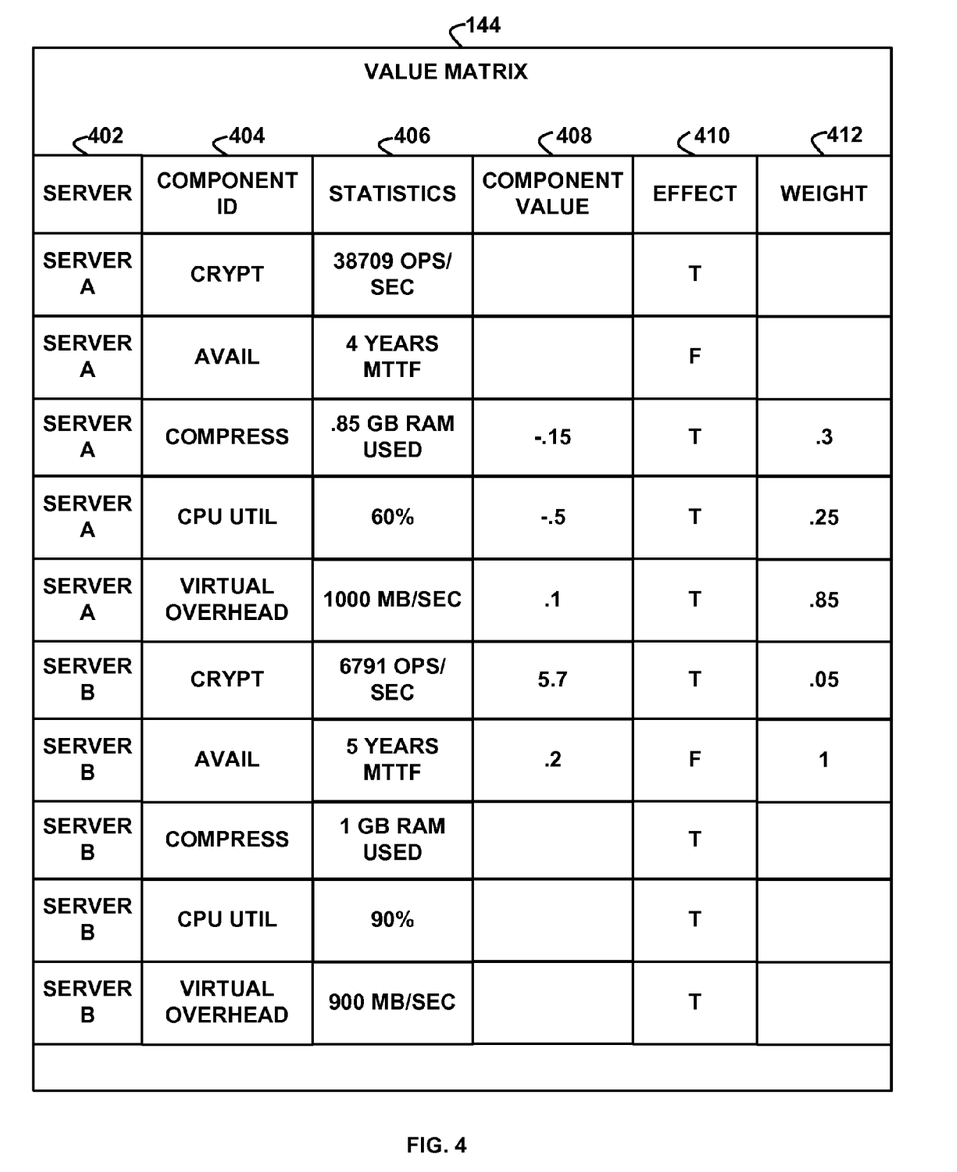
FIG. 4 depicts a block diagram of an example value matrix, according to an embodiment of the invention.

FIG. 4 depicts a block diagram of an example value matrix 144 for a selected workload, according to an embodiment of the invention. Different selected workloads may have the same or different data in their value matrix. The value matrix 144 comprises any number of entries, each of which comprises a server identifier field 402, a component identifier (ID) field 404, a statistics field 406, a component value field 408, an effect field 410, and a weight field 412. The server identifier 402, in each entry, identifies a server computer system (e.g., the computer systems 100, 132, or 133). The component identifier field 404 identifies a program or hardware component, unit, module, or other feature, of the server identified by the server identifier field 402, in the same entry, the operation of which the application 150 quantitatively measures and stores in the statistics field 406, in the same entry. In various embodiments, the statistics field 406 describes, characterizes, or represents the performance of the component 404, or the amount of resources of the component 404 that are used by the executing the selected workload on the candidate server computer system, identified by the server identifier 402, in the same entry. In other embodiments, the statistics field 406 describes or characterizes attributes of the candidate server computer system identified by the server identifier 402, in the same entry. The component value 408 specifies a relative value, importance, rank, or worth of the component, as characterized by the statistics 406, in the same entry, as compared to other components in the value matrix. The effect field 410, in each entry specifies whether or not the component, in the same entry, impacts or changes the performance of the selected workload. The weight 412, in each entry specifies the relative importance of the component value 408, in each entry. In various embodiments, the functions 146 and/or application 150 receives the component value 408, the effect 410, and/or the weight 412 from the user I/O device 121, the computer systems 132 or 133 or calculates the component value 408, the effect 410, and/or the weight 412, as further described below.

Examples of components 404 comprise a cryptographic accelerator (crypt), hardware and program availability (avail), data compression (compress), CPU utilization (util), and virtualization overhead (virtual overhead), although in other embodiments any appropriate components 404 and statistics 406 may be used. In various embodiments, the cryptographic accelerator may be implemented in different servers in hardware or as a program. The statistics 406 for the cryptographic accelerator specify the maximum throughput performance of cryptographic private key (sign) operations per second for a specific workload. For example, the cryptographic accelerator of the server A performs 38,709 operations/second while the cryptographic accelerator of the server B performs 6,791 operations/second, the ratio of which the application 150 or the function 146 calculates as 5.7:1, meaning that approximately six server B computers are needed to equal the performance of a single server A computer to perform the cryptographic computation for the selected workload 148. Thus, the application 150 or the function 146 sets the component value 408 of the cryptographic accelerator component for the server B (with the lower performing cryptographic accelerator) to be the calculated ratio of 5.7 and sets the component value 408 of the cryptographic accelerator component at the server A (the higher performing cryptographic accelerator) to be blank or no value. The application 150 executes the selected workload 148 on the server B both with cryptographic operations active and inactive, collects statistics 406 that specify the performance of the executed selected workload 148, and compares the performance of the selected workload 148 and determines that cryptographic operations impact or affect (reduce) the performance of the selected workload 148 by 5% on the server B, so the application 150 sets the weight 412 for the component value 408 of the cryptographic accelerator to be 0.05. In another embodiment, the application 150 receives the weight 412 from the user I/O device 121 or the computer system 132 or 133.

In this example, the hardware and program availability or MTTF (mean time to failure) component has different statistics 406 for the server A and the server B. The application 150 receives the statistics 406 for the mean time to failure from the user I/O device 121 or the computer systems 132 or 133. The server A has a lower MTTF statistic 406 than does the server B, and the application 150 calculates that the MTTF of the server A is 20% lower than the MTTF of the server B, so the application 150 sets the component value 408 of the server B to be 0.2 and sets the component value 408 for the server A to be blank or no value. Since the component of availability (MTTF) does not impact or change the performance of the selected workload 148 (as represented by the effect 410 indicating false), the application 150 sets to the weight 412 for the availability (MTTF) component in the server B to one.

The server A provides the component of real-time memory data compression (compress), which reduces the amount of memory required to execute the selected workload 148. The application 150 executes the selected workload 148 on the server A and the server B and calculates that the real-time memory data compression reduces the memory used by the selected workload 148 on the server A versus the server B by 15%, so to the application 150 stores the component value 408 of −0.15 for the server A and leaves the component value 408 for the server B blank, indicating no value. The component value 408 for the server A is negative because the component value has a positive effect on the original server cost of the server A by potentially reducing the amount of memory required by the server A versus the server B. The application 150 sets the weight 412 for the component value 408 assigned to data compression for the server A to 0.3 because the application 150 calculated, by executing multiple workloads 148 on the server A, that data compression decreases the amount of memory in 30% of the workloads 148 executed.

The application 150 executes the selected workload 148 on the server A and the server B and calculates their respective CPU utilization percentages as the statistics 406 for the component of CPU utilization (util). Since the server A provides a 1.5 times CPU performance advantage over the server B, the application 150 sets the component value 408 for CPU utilization of server A to −0.5 and sets the weight 412 of the server A component value 408 to 0.25 because the application 150 calculated that the workload 148 executing at the server A has its performance impacted 25% by the CPU utilization component.

The server A and the server B use different virtualization software technologies which have different virtualization overhead. The application 150 executed the selected workload 148 on both the server A and the server B and calculated that the server B virtualization implementation is 10% slower than the virtualization implementation on Server A, so the application 150 sets the component value 408 for the virtualization overhead in the server A to be 0.1. The application 150 sets the weight 412 for the virtualization overhead component value for the server A to 0.85 because the application 150 executed the selected workload 148 on the sever A both with and without virtualization and calculated that the performance of the selected workload 148 with virtualization is 85% of the performance of the workload 148 without virtualization.

Figure 5:
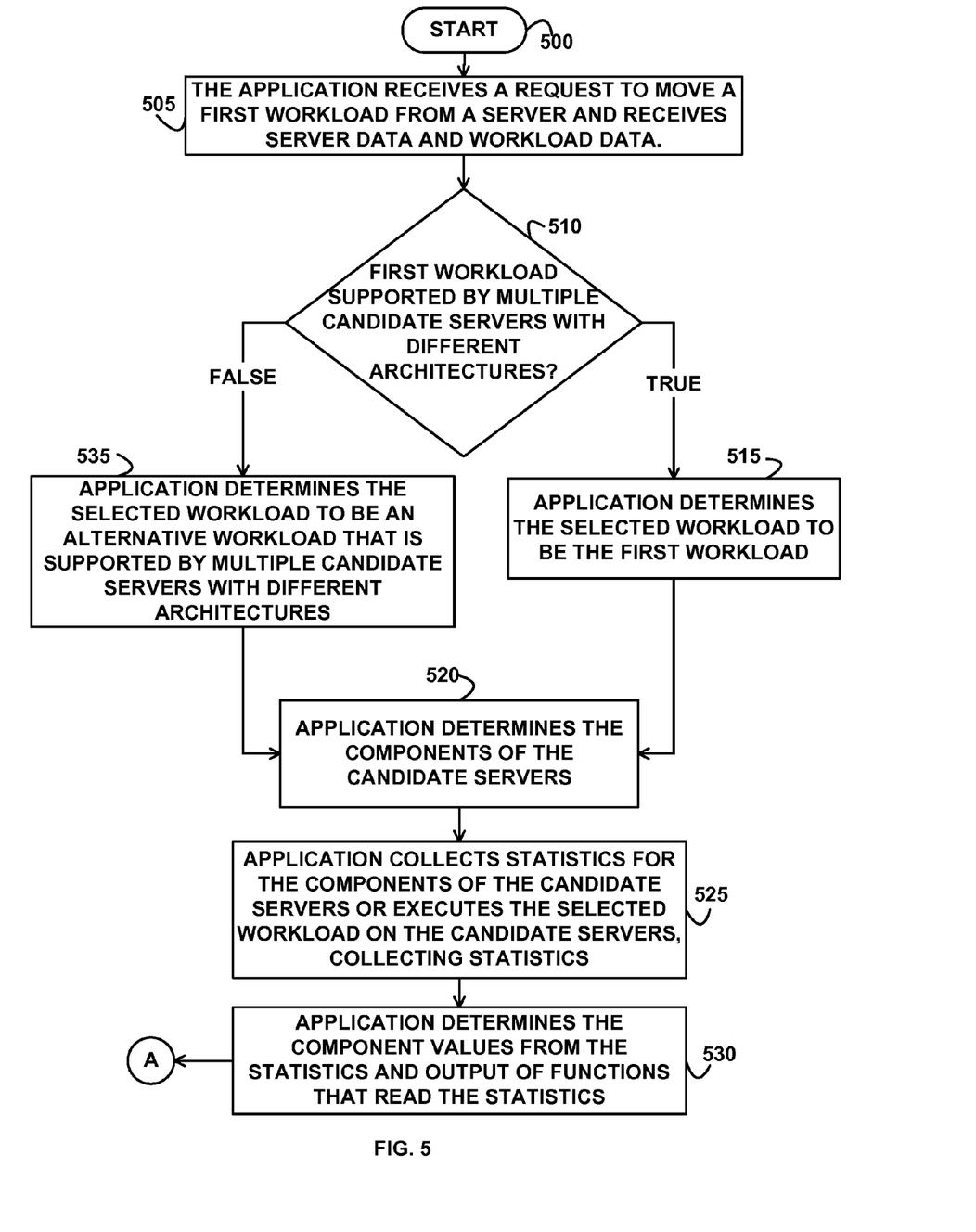
FIG. 5 depicts a flowchart of example processing for a request to move a workload, according to an embodiment of the invention.

FIG. 5 depicts a flowchart of example processing for a request to move a workload, according to an embodiment of the invention. Control begins at block 500. Control then continues to block 505 where the application 150 receives a request to move a first workload 148 from a server, such as the computer system 100, 132, or 133. In various embodiments, the application 150 receives the request from the user I/O device 121 or from the computer systems 132 or 133 via the network 130. The request identifies a first workload 148 and optionally one or more of the functions 146. The application 150 further receives the server data 142 and the workload data 140 or portions of the server data 142 and the workload data 140. In various embodiments, the application 150 receives the server data 142 and the workload data 140 from the user I/O device 121 or from the computer systems 132 and/or 133. In other embodiments, the application 150 calculates some or all of the server data 142 and/or the workload data 140, as further described below.

Control then continues to block 510 where the application 150 determines whether the first workload is supported by multiple candidate servers 304 with different architectures 306. The application 150 makes the determination of block 510 by determining whether the received first workload identifier matches multiple workload identifiers 302 in the server data 142, each having different supported by server identifiers 304 and different architectures 306. If the determination at block 510 is true, then the first workload 148 is supported by multiple candidate servers 304 with different architectures 306, so control continues to block 515 where the application 150 determines a selected workload 148 to be the workload 148 identified by the received first workload identifier.

Control then continues to block 520 where the application 150 determines the components of the candidate servers (that support the selected workload 148 and that have different architectures) by reading the component identifiers 404 from the entries in the value matrix 144 of the candidate servers. Control then continues to block 525 where the application 150 collects statistics 406 for the components of the candidate servers or executes the selected workload 148 on the candidate servers, collecting statistics 406, which the application 150 stores to the value matrix 144. In an embodiment, the application 150 sends a request that identifies the selected workload 148 to the candidate servers or a repository server, which responds with the statistics 406. In another embodiment, the application 150 instructs the candidate servers to execute the selected workload 148 on the candidate servers for a period of time, collect the statistics 406 generated by executing the workload 148, and return the statistics 406 to the application 150, which stores the statistics 406 in the value matrix 144. In another embodiment, the application 150 receives the statistics 406 from the user I/O device 121. Control then continues to block 530 where the application 150 determines the component values 408 from the statistics 406 and from the output of functions 146 (identified by the request) that read the statistics 406. The application 150 stores the component values 408 to the value matrix 144.

Figure 6:
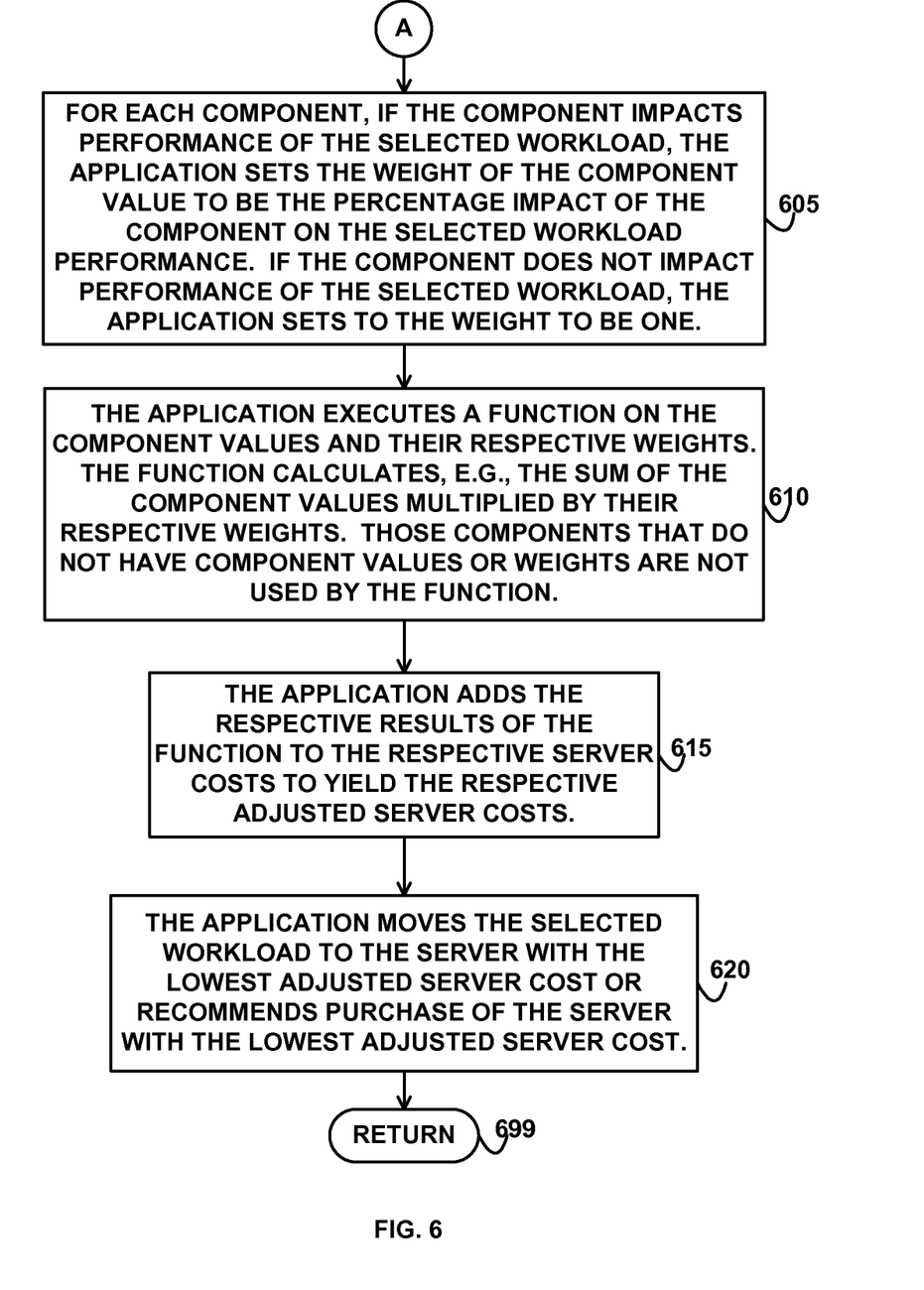
FIG. 6 depicts a flowchart of further example processing for a request to move a workload, according to an embodiment of the invention.

Control then continues to block 605 of FIG. 6 where, for each component identified by the component identifier 404, if the component impacts (changes) performance of the selected workload 148, the application 150 sets the weight 412 of the component value 408 to be the percentage impact of the component on the selected workload performance. If the component identified by the component identifier 404 does not impact performance of the selected workload 148, the application 150 sets to the weight 412 to be one. The application 150 determines whether the component impacts the performance of the selected workload 148 by determining whether the effect field 410 of the component 404 indicates true or false. The application 150 determines the percentage impact of the component on the selected workload performance by receiving the percentage impact from the user I/O device 121, by receiving the percentage impact from the computer systems 132 or 133 via the network 130, or by executing the workload 148 on the candidate server computer systems with the component active or enabled, by executing the workload 148 on the candidate servers with the component inactive or turned off, and calculating the percentage difference between the performance of the workload 148 with the component active and with the component inactive. In another embodiment, the application 150 determines the percentage impact by executing the function 146 identified by the request.

Control then continues to block 610 where the application 150 executes the function 146 identified by the request on the component values 408 and their respective weights 412. The function 146 calculates, e.g., the sum, or other user supplied function, of the component values 408 multiplied by their respective weights 412, to yield a result. The function 146 does not include in the calculation those components that do not have component values 408 or weights 412. Control then continues to block 615 where the application 150 adds (or other function) the respective results of the function 146 to the respective server costs 305 to yield the respective adjusted server costs 310 and stores the respective adjusted server costs 310 to the server data 142, for each candidate server. Control then continues to block 620 where the application 150 moves the selected workload 148 from the current server (deleting the selected workload from the current server or stopping the execution of the selected workload at the current server) to the candidate server with the lowest adjusted server cost 310 or recommends to a user the purchase of the candidate server with the lowest adjusted server cost 310. The application may start execution of the selected workload at the selected candidate server with the lowest adjusted server cost 310. Control then continues to block 699 where the logic of FIGS. 5 and 6 returns.

Referring again to FIG. 5, if the determination at block 510 is false, then the first workload 148 is not supported by multiple candidate servers with different architectures 306, so control continues to block 535 where the application 150 determines the selected workload 148 to be an alternative workload 204, in the same entry as the first workload 148 in the workload data 140, that is supported by multiple candidate servers 304 with different architectures 306. Control then continues to block 520, as previously described above.

In this way, in an embodiment, a server is selected with a lowest adjusted cost.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:
1. A method comprising:
 receiving a request to move a first workload from a server;
 determining whether the first workload is supported by a plurality of candidate servers with different architectures;

if the first workload is supported by the plurality of candidate servers with different architectures, determining that a selected workload is the first workload;

if the first workload is not supported by the plurality of candidate servers with the different architectures, determining that the selected workload is a second workload that is an alternative to the first workload, wherein the second workload is supported by the plurality of candidate servers with the different architectures;

determining components of the plurality of candidate servers;

collecting statistics for the components;

determining component values of the components based on the statistics;

if the components impact performance of the selected workload, setting weights for the components that impact the performance to be a percentage impact of the components on the selected workload;

calculating functions of the component values and the weights to yield results;

processing the results of the functions to costs of the plurality of candidate servers to yield a plurality of adjusted costs of the plurality of candidate servers; and moving the selected workload from the server to a target server that is one of the plurality of candidate servers with a lowest of the plurality of adjusted costs.

2. The method of claim 1, further comprising:
if the components do not impact performance of the selected workload, setting weights for the components that do not impact the performance of the selected workload to be one.

3. The method of claim 2, wherein the collecting the statistics further comprises:
executing the selected workload on the plurality of candidate servers; and
storing the statistics that describe performance of the component while executing the workload.

4. The method of claim 3, wherein the determining the component values of the components based on the statistics further comprises:
setting the component values to be ratios of the statistics of the components.

5. The method of claim 1, wherein the component values comprise quality of service component values.

6. A system for selecting a target server for a workload, comprising:
a processor; and
a decision support application stored on a memory executing on the processor, the decision support application adapted to:
identify a plurality of candidate servers that have the ability to process a workload, wherein the plurality of candidate servers include a plurality of different architectures;
identify a plurality of qualitative and quantitative properties associated with the plurality of candidate servers, wherein the identifying comprises:
determining components of the plurality of candidate servers;
collecting statistics for the components; and
determining component values of the components based on the statistics;
modify the plurality of qualitative and quantitative properties based on user-defined criteria for decision making; and
analyze the modified qualitative and quantitative information using a Cost-Value Matrix to identify a target server.

7. The system of claim 6, wherein the modifying of the plurality of qualitative and quantitative properties based on user-defined criteria for decision making comprises:
if the components impact performance of the selected workload, setting weights for the components that impact the performance to be a percentage impact of the components on the selected workload;
calculating functions of the component values and the weights to yield results; and
processing the results of the functions to costs of the plurality of candidate servers to yield a plurality of adjusted costs of the plurality of candidate servers.

8. The system of claim 7, wherein the decision support application is further adapted to:
if the components do not impact performance of the selected workload, setting weights for the components that do not impact the performance of the selected workload to be one.

9. The system of claim 8, wherein the collecting the statistics further comprises:
executing the selected workload on the plurality of candidate servers; and
storing the statistics that describe performance of the component while executing the workload.

10. The system of claim 9, wherein the determining the component values of the components based on the statistics further comprises:
setting the component values to be ratios of the statistics of the components.

11. The system of claim 10, wherein the component values comprise quality of service component values.

12. A computer program product for selecting a target server for a workload, the computer program product comprising a non-transitory computer readable storage medium having program code embodied therewith, the program code executable by a computer to perform a method comprising:
receiving a request to move a first workload from a server;
determining whether the first workload is supported by a plurality of candidate servers with different architectures;
if the first workload is supported by the plurality of candidate servers with different architectures, determining that a selected workload is the first workload;
if the first workload is not supported by the plurality of candidate servers with the different architectures, determining that the selected workload is a second workload that is an alternative to the first workload, wherein the second workload is supported by the plurality of candidate servers with the different architectures;
determining components of the plurality of candidate servers;
collecting statistics for the components;
determining component values of the components based on the statistics;
if the components impact performance of the selected workload, setting weights for the components that impact the performance to be a percentage impact of the components on the selected workload;
calculating functions of the component values and the weights to yield results;
processing the results of the functions to costs of the plurality of candidate servers to yield a plurality of adjusted costs of the plurality of candidate servers; and moving the selected workload from the server to a target server that is one of the plurality of candidate servers with a lowest of the plurality of adjusted costs.

13. The computer program product of claim 12, wherein the method further comprises:
    if the components do not impact performance of the selected workload, setting weights for the components that do not impact the performance of the selected workload to be one.

14. The computer program product of claim 13, wherein the method further comprises:
    executing the selected workload on the plurality of candidate servers; and
    storing the statistics that describe performance of the component while executing the workload.

15. The computer program product of claim 14, wherein the determining the component values of the components based on the statistics further comprises:
    setting the component values to be ratios of the statistics of the components.

16. The computer program product of claim 12, wherein the component values comprise quality of service component values.

* * * * *